(12) United States Patent
Foster et al.

(10) Patent No.: US 7,944,470 B2
(45) Date of Patent: May 17, 2011

(54) WIRELESS INTEGRATED SECURITY CONTROLLER

(75) Inventors: Sloan B. Foster, San Antonio, TX (US); William Lawrence, San Antonio, TX (US); Matthew C. Reedy, San Antonio, TX (US)

(73) Assignee: Armida Technologies Corporation, San Antonio, TX (US)

( * ) Notice: Subject to any disclaimer, the term of this patent is extended or adjusted under 35 U.S.C. 154(b) by 477 days.

(21) Appl. No.: 12/057,170

(22) Filed: Mar. 27, 2008

(65) Prior Publication Data

US 2008/0288986 A1 Nov. 20, 2008

Related U.S. Application Data

(63) Continuation-in-part of application No. 11/368,893, filed on Mar. 6, 2006.

(60) Provisional application No. 60/658,527, filed on Mar. 4, 2005.

(51) Int. Cl.
*H04N 7/18* (2006.01)
(52) U.S. Cl. ....................................................... 348/143
(58) Field of Classification Search ................... 348/143
See application file for complete search history.

(56) References Cited

U.S. PATENT DOCUMENTS

| | | | |
|---|---|---|---|
| 6,859,442 B1 * | 2/2005 | Agarwal et al. | 370/316 |
| 6,970,183 B1 * | 11/2005 | Monroe | 348/143 |
| 6,996,129 B2 * | 2/2006 | Krause et al. | 370/487 |
| 2002/0019984 A1 | 2/2002 | Rakib | |
| 2004/0148632 A1 | 7/2004 | Park et al. | |
| 2006/0161960 A1 | 7/2006 | Benoit | |
| 2006/0200845 A1 | 9/2006 | Foster et al. | |
| 2007/0022449 A1 | 1/2007 | Boyden et al. | |
| 2007/0076094 A1 * | 4/2007 | Dickerson et al. | 348/143 |
| 2008/0288986 A1 * | 11/2008 | Foster et al. | 725/62 |

* cited by examiner

*Primary Examiner* — James M Hannett
(74) *Attorney, Agent, or Firm* — Hulsey, P.C.; William N. Hulsey, III; Loren T. Smith

(57) ABSTRACT

A system and method are disclosed for improved video transmission, particularly in security settings. An improved security controller combines the interfaces and functionality for high quality video delivery over often less-than-perfect wireless networks, multi-camera analog/digital video controllers and encoders, multi-frequency wireless camera support, connectivity for serial controllers, network switching, and distributed digital video recording with optional object and motion detection. The video transmission is enhanced using wireless adaptive video encoding, mobile viewing optimization, and wireless bandwidth improvement.

8 Claims, 9 Drawing Sheets

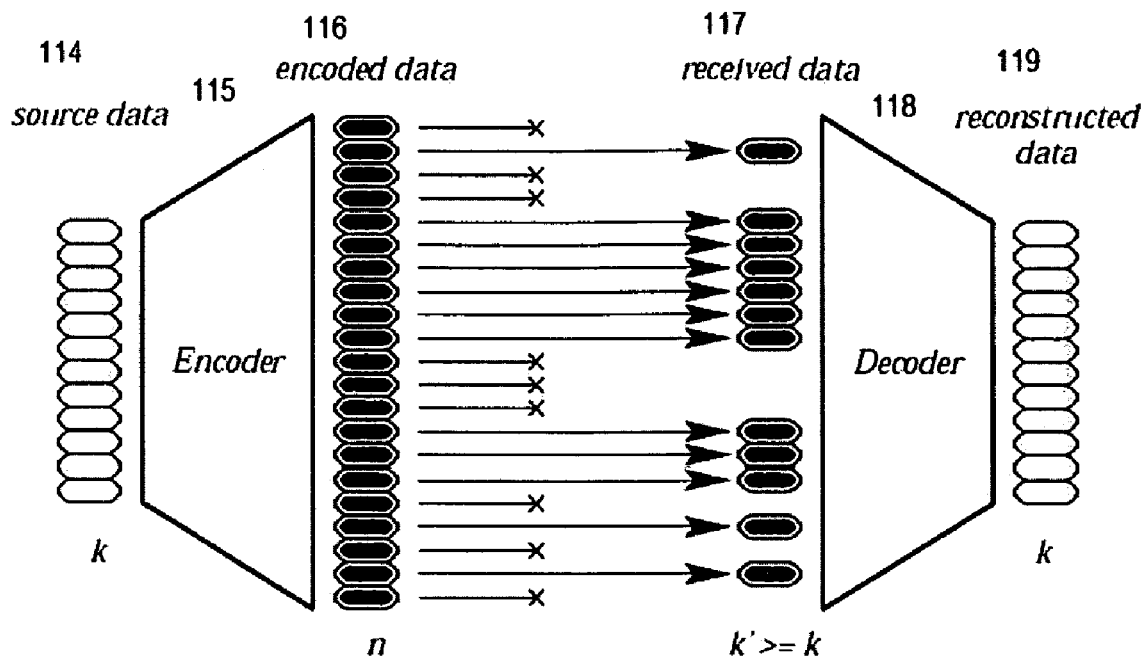
FIGURE 7.
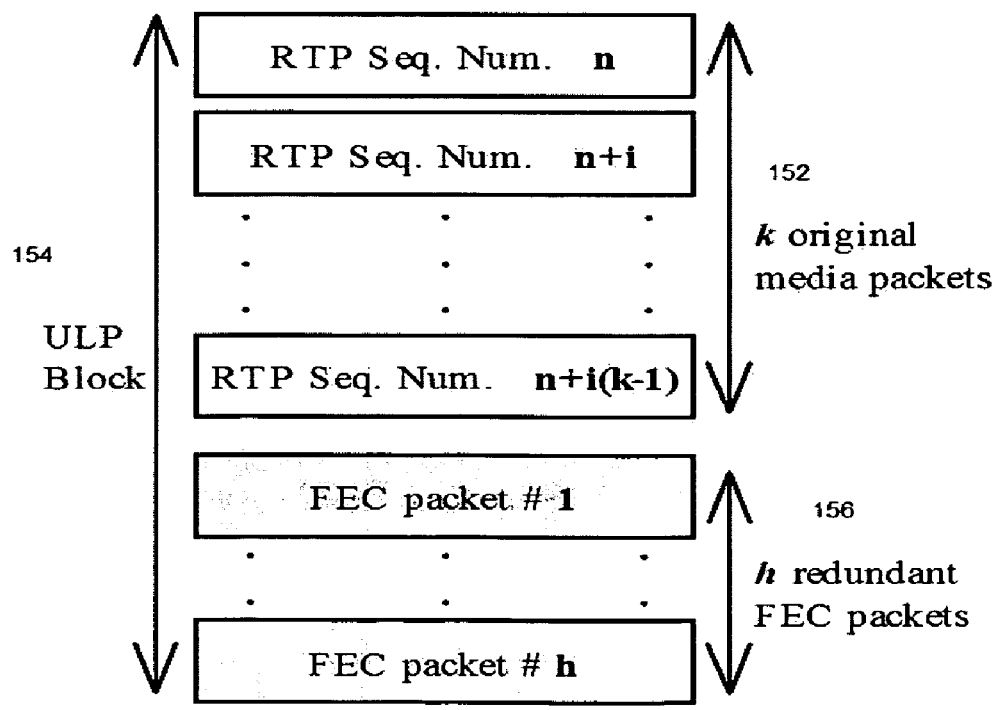
Figure 9: UB structure details.

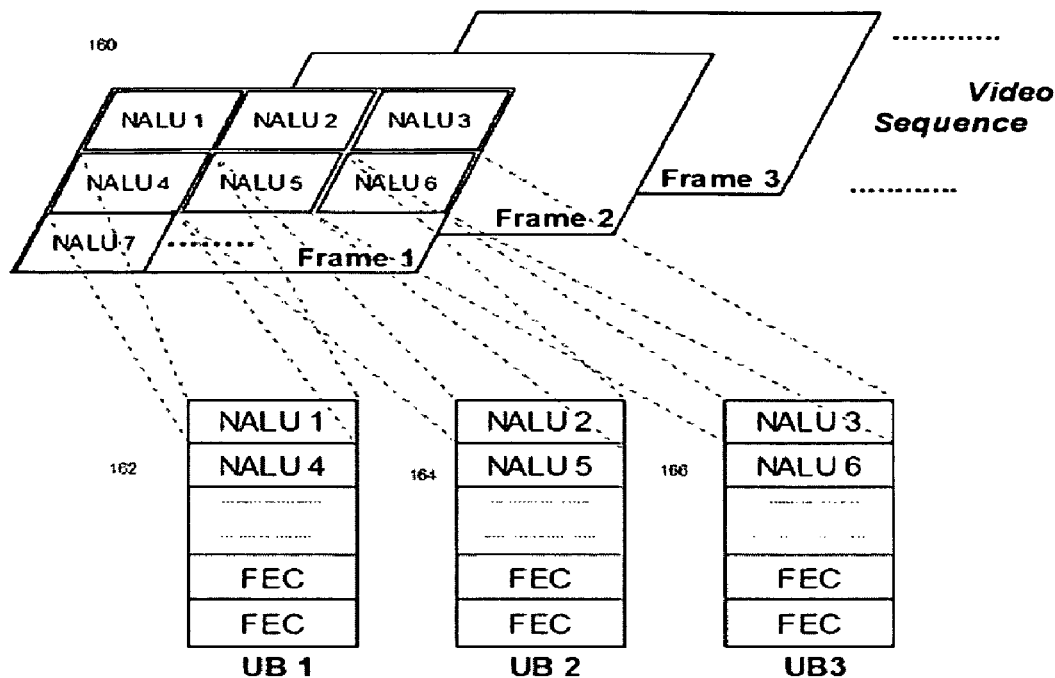
Figure 10 UI-FEC scheme.
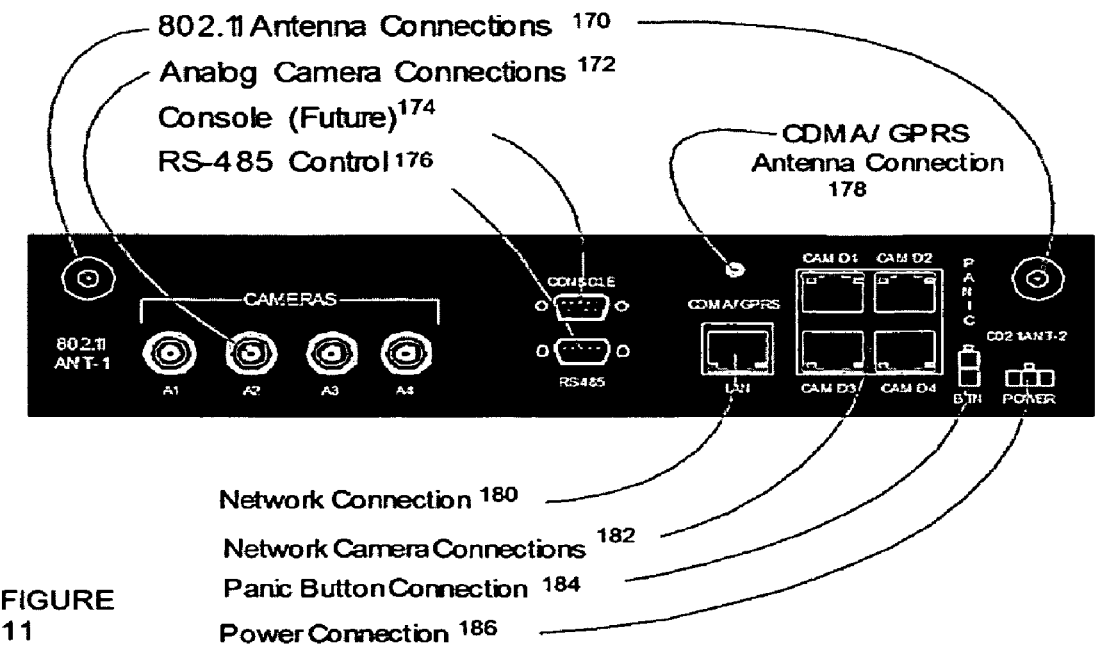
FIGURE 11

WIRELESS INTEGRATED SECURITY CONTROLLER

CROSS REFERENCE TO RELATED APPLICATIONS

This application is a continuation-in-part of U.S. patent application Ser. No. 11/368,893, entitled "Wireless Integrated Security Controller" filed Sep. 7, 2005, and claims the benefit of priority to U.S. Provisional Patent Application No. 60/908,338 entitled, "Wireless Integrated Security Controller" filed Mar. 27, 2007, both of which are hereby incorporated by reference as if fully set forth herein.

BACKGROUND OF THE PRESENT DISCLOSURE

1. Field of the Present Disclosure

The present disclosure relates generally to the field of video transmission, and may have particular application in the field of video security.

2. Description of the Related Art

Historically, the security and surveillance market has been dominated by analog closed-circuit television (CCTV) systems that have operated in a relatively isolated fashion and have been largely overlooked by any remarkable technological advancement. Expensive to install and vexing to maintain, CCTV systems require deployment of a complex network of coaxial cables or fiber cables and connecting to a number of analog cameras, stationary monitors, and videocassette recorders for archiving functions. Once the difficult installation procedure is completed, the buyer must also maintain a storage room to house the archives of videotapes. Reviewing historical video is time-consuming and tedious; as videotapes degrade rapidly, the quality of the archive will be poor. Since CCTV systems are analog-based (not digital), recorded images can only be viewed from videotapes using a video player connected to monitors. Once such a CCTV system is in place, even a minor change can be a major expense, with the hassle of running new cables and determining what hardware will work with the existing system.

The traditional approach to video surveillance and security employs coaxial, fiber-optic, or other types of cabling for connecting the various elements. There are numerous serious problems with this approach: Cables are easily damaged or severed by bad weather, birds, insects, accidents or saboteurs, and thus require nearly constant monitoring, maintenance and repair. If the cameras are somewhat distant from the monitoring station, then expensive trenching may be required to lay the cables. Furthermore, cables cannot be strung over long distances without sacrificing image quality or having to build expensive booster stations along the way. The use of cable thus requires the close physical proximity of the monitoring stations to the areas under video surveillance, or leasing expensive communications facilities from service providers.

The recent trend toward "convergence"—combining traditional CCTV applications with digital data networking technology—has ushered in a welcome change in the CCTV industry. The most widely available digital products are known generically as video servers. These devices can deliver live video automatically or on request, to a web browser or other professional security applications. This device typically connects up to 4 standard analog cameras via coaxial cable. The video server then digitizes, compresses, and distributes the video streams over an Ethernet interface onto a computer network, effectively turning analog cameras into network cameras.

Following on the heels of video servers has been the development of digital (also known as IP or Internet Protocol) cameras. These cameras are more expensive than their analog counterparts, but are able to connect directly to a digital computer network, and their video can be viewed from any workstation that is connected to the same network. The drawback to digital cameras is that they typically send large amounts of data (video streams contain very large amounts of data; on the order of 10 to 100 times more than is usually sent over a normal data network at one time) and can quickly overload a computer network. Even some of the newer cameras that can support video compression still send far more video data across the network than is usually seen in a data only network.

Once the video has been digitized, it can be easily recorded for later review using recently developed digital video recorder (DVR) technology rather than using old style videotapes. DVRs allow the recording of large amounts (thousands of hours) of video on very large computer hard disks, as well as provide fairly easy-to-use rewind, search and play functions on the video from any personal computer or web browser. However, most commercial DVR devices are standalone units and are not integrated with cameras or other network devices.

As security systems transition to digital technologies, there has been a strong desire to move toward wireless video surveillance using a variety of proprietary microwave technologies. Unfortunately, since most of the commercially available wireless products are designed for the computer data networking (as opposed to streaming video surveillance), network configuration is very complicated. Plus, video quality suffers from limited available wireless bandwidth (since video contains so much more data than normal data networks) and unstable wireless connections. Off-the-shelf wireless systems have very limited security capabilities and are subject to relatively easy interception. Expensive, specialized professional services for design, implementation, and ongoing support are also often required.

In addition to video surveillance, physical security also involves the need to monitor and manage a variety of other devices such as fire & burglar alarm control panels, access control mechanisms (swipe card, biometric or keypad entry for doors and gates), and environmental sensors (temperature, liquid, etc.). These devices are usually monitored and programmed using remote computer terminals that are connected to the devices using a serial data connection (known as RS-232, RS-422 or RS485 communications). Thus, long strings of wires must be run from these devices back to a central monitoring station where a terminal is used to monitor the activity at the devices and to program them to perform in the desired fashion.

In summary, the primary challenges facing implementers of security and surveillance systems today are several: 1) while wireless communication is an ideal choice to reduce the amount of cabling that has to be done both for surveillance cameras, the technology has many drawbacks (such as limited bandwidth and signal interference resulting in lost data) that especially disrupt the transmission of video; 2) many current wireless systems use proprietary radios and communication methods that prevent users from integrating them with the existing standards-based networks; 3) integrators wishing to provide remote monitoring and recording of surveillance video must today purchase several products from several vendors and tediously knit them together into an integrated solution using hardwired cables; and 4) security implementers wishing to provide remote monitoring and control of fire and burglar alarm panels, access control devices and environmental sensors along with surveillance video also have to select multiple products from multiple vendors and struggle with identifying the source of problems when the system fails to operate correctly.

Accordingly, what is needed are an integrated security controller and an enhanced video transmission method of the type disclosed herein.

SUMMARY

An improved security controller is disclosed. In a preferred embodiment, the controller is a single hardware and software device that combines the interfaces and functionality of virtually all commonly required security and surveillance tasks: high quality video delivery over often less-than-perfect wireless networks, multi-camera analog/digital video controllers and encoders, multi-frequency wireless camera support, connectivity for RS232/422/485 and other serial devices, Ethernet switching, and distributed digital video recording with optional object and motion detection.

There are three embodiments disclosed that may also be implemented to enhance the functionality of the security encoder: wireless adaptive video encoding, wireless bandwidth improvement and security device integration. These are disclosed in further detail below.

The above summary of the present disclosure is not intended to represent each embodiment, or every aspect, of the present disclosure. The detailed description and FIGUREs will describe many of the embodiments and aspects of the present disclosure.

BRIEF DESCRIPTION OF THE DRAWINGS

The accompanying drawings, which are incorporated in and constitute a part of this specification, illustrate several embodiments of the present disclosure and together with the description, serve to explain the principles of the present disclosure.

The foregoing and other advantages of the present disclosure will become apparent upon reading the following detailed description and upon reference to the drawings, wherein:

FIG. 7 illustrates a typical Forward Error Correction (FEC) algorithm in operation.

FIG. 9 illustrates the unequal interleaving technique of the Forward Error Correction (FEC) algorithm.

FIG. 10 illustrates the block coding method used with the unequal interleaving technique of the Forward Error Correction (FEC) algorithm.

DETAILED DESCRIPTION OF THE PRESENT DISCLOSURE

Reference will now be made in detail to the present embodiments of the present disclosure, examples of which are illustrated in the accompanying drawings. Wherever possible, the same reference numbers will be used throughout the drawings to refer to the same or like parts (elements).

Figure 1:
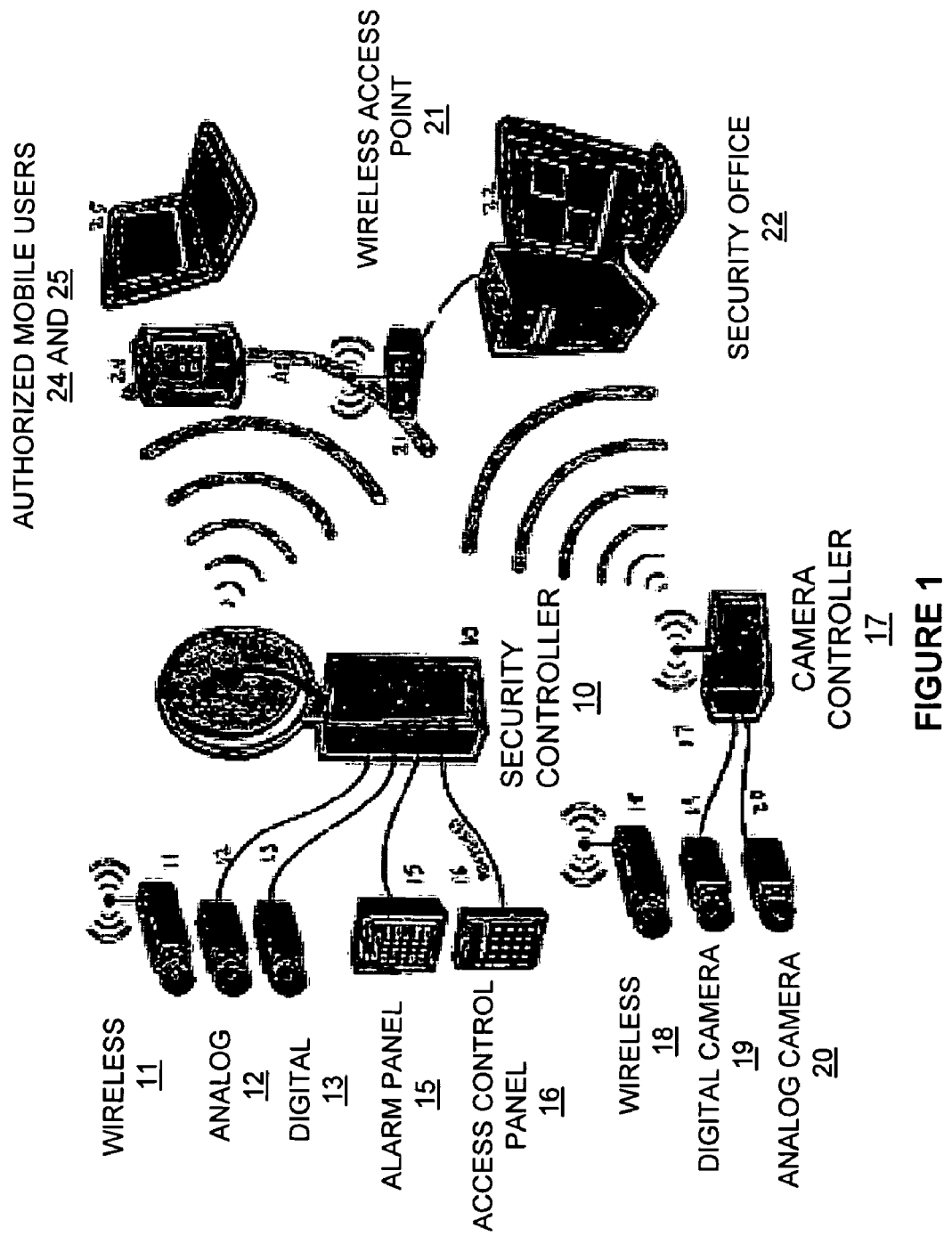
FIG. 1 illustrates a block diagram of an integrated security controller in accordance with the present disclosure and associated security network devices or nodes.

As referenced above, embodiments of the present disclosure provide an integrated wireless security controller with improved video transmission. FIG. 1 illustrates a typical installation of the security controller 10. Attached or connected to it are from one to four digital wireless cameras 11, from one to four wired analog cameras 12, and from one to four wired digital (IP) cameras 13. In addition, other security devices such as alarm control panels 15 and access control panels 16 can be attached. The security controller 10 receives the video feeds from the cameras, and if the video is analog, it digitizes it into MPEG-4 format. (Digital (IP) cameras 11 and 13 supply video in digital format already.) Control and monitoring information from the alarm panel 15 and access control panel 16 is received by the security controller over a serial interface and is then digitized. All of this video and control information is then encrypted using AES encryption and encapsulated using the disclosed system software before being transmitted wirelessly over an 802.11a/b/g or 900 MHz or 4.9 GHz network. Local security guards and other authorized mobile users who are in proximity to the security controller can receive the wireless video and alarm & access control streams using handheld computers 24 and laptop computers 25. They can also control the pan, tilt & zoom (PTZ) features of the cameras from these devices as well as interact with the alarm panels 15 and access control devices 16 that are attached to the security controller 10. Remote storage & monitoring of the video is done at a central office (also called a "head end") 22. An off-the-shelf wireless access point 21 at this location receives the wireless streams from the security controller 10. The streams are decrypted and decoded using software that runs on the computer 22. The camera controller 17 is a smaller, less capable version of the security controller 10. The camera controller 17 can interface with one or two wireless digital cameras 18, one or two wired digital cameras 19 or one or two wired analog cameras 20 only. It does not have connectivity for alarm panels 15 or access control panels 16. It encodes, encrypts and encapsulates the video from the connected cameras 18, 19 or 20 and transmits the video wirelessly to local authorized mobile users 24 and 25 and/or to a central office 22 using a similar access point device 21 as the security controller 10.

Figure 2:
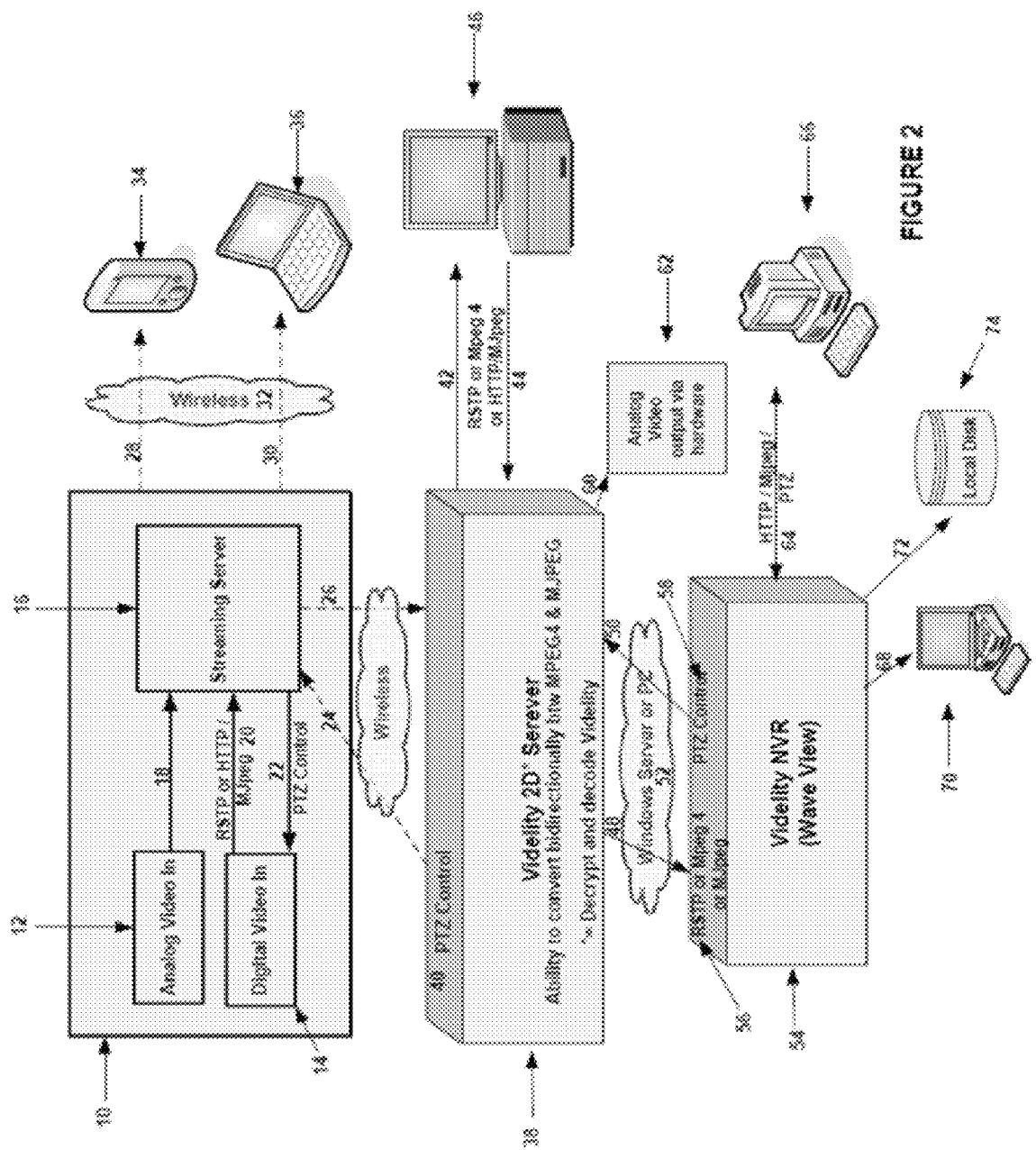
FIG. 2 illustrates a diagram detailing the information flow and software components of the present disclosure.

FIG. 2 illustrates the video components of FIG. 1 at a more granular level of detail, highlighting the software components that exist in the embodiment. The security controller 10 accepts analog video input 12 and digital video input 14 from connected cameras (either wired or wireless). For analog video input 18, the security controller first digitizes the video into MPEG-4 format and then passes it to the streaming server software module 16. For digital video input 20, the incoming video format is either MPEG-4 or MJPEG (Motion JPEG). These video streams are passed directly to the streaming server 16 where they may be transcoded to alternate video formats for transmission. The streaming server first encrypts the video streams using AES (Advanced Encryption Standard), encapsulates the video streams using the disclosed system software (described later) and then transmits the video streams wirelessly 26. Authorized mobile users in proximity to the security controller 10 can access these video streams 28 and 30 wirelessly 32 and view them using handheld computers 34 and laptop computers 36. In addition, these authorized mobile users can access any network to which the security controller 10 is connected, such as a company intranet or the Internet. Used in this manner, the security controller 10 can function as a standard wireless access point. The security controller 10 also transmits the video streams wirelessly 26 to the monitoring location where they can be viewed and recorded. The streams are received at the monitoring location through a wireless access point (not shown) and fed to the disclosed system 2D Server software 38 running on a Microsoft Windows server or PC 52. This software 38 first removes the disclosed system encapsulation from the video stream, then decrypts the encrypted video and passes the video stream via the network 48 to the disclosed system NVR (Network Video Recorder) software 54. The disclosed system NVR software 54 can display the video on a user's computer 70, record the video to a server computer 74 via the network 72, or allow access to the video to other computers 66 that may be connected directly or via the Internet 64. Users of the video streams 70 and 66 may control the orientation of the cameras using pan, tilt & zoom (PTZ) control via the network 64 and 68. Using the disclosed system NVR software 54, users issue PTZ commands which are sent to first to the disclosed system 2D Server 38 via a control socket 50, then on to the streaming server 16 via control sockets 40 and 24. These PTZ commands are then sent to the cameras from the streaming server 16 via direct connections 22 in the security controller 10. The disclosed system 2D Server 38 has two additional functions: the ability to send video to third party NVR software products and the ability to output analog video via hardware. The disclosed system 2D Server 38 can send video streams via the network 42 to other NVR software products 46 for viewing and recording. These NVR software programs 46 can also issue PTZ commands to the cameras via the network 44 to the disclosed system 2D Server 38, which commands are then sent to the streaming server 16 via control sockets 40 and 24. The disclosed system 2D Server 38 can also send its output directly to analog TV monitors via hardware 60, allowing users to view the video directly on existing television screens.

Figure 3:
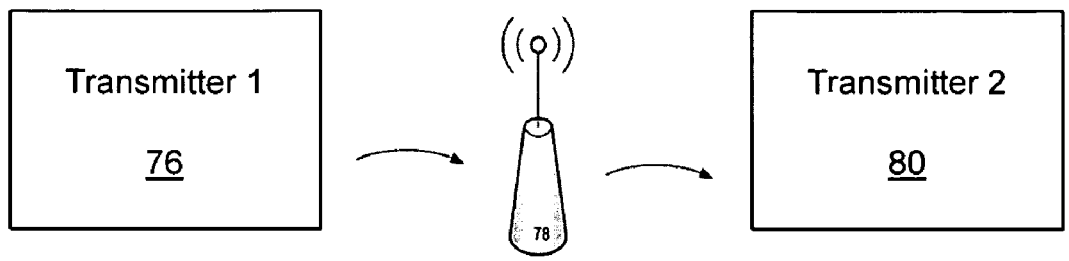
FIG. 3 illustrates how the present disclosure can be used in environments where wireless devices are separated by sufficient distance and obstructions that they need to relay information to each other.

FIG. 3 illustrates the use of multiple units of the present disclosure where cameras are widely dispersed in a location. One security controller 76 can be installed in one corner of a location and transmit video to the monitoring location 78 where the video is received via a wireless access point. Another security controller 80 can be installed in another corner of the location and be simultaneously transmitting video to the same access point 78 and monitoring location.

Figure 4:
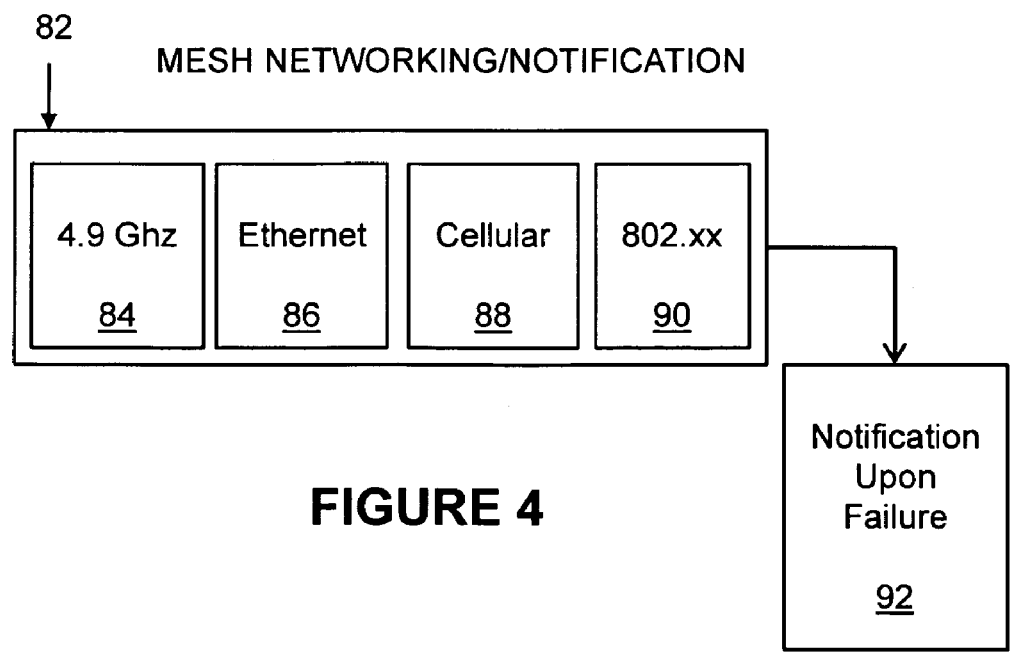
FIG. 4 illustrates the components of the integrated security controller that handle communication, and how a notification is generated if any of them fail.

FIG. 4 illustrates the feature of the present disclosure to "fail over" to alternate forms of communication when the primary method fails. The present disclosure typically uses the 802.xx wireless method 90 for communicating with authorized mobile users and the monitoring location. This method includes IEEE 802.11 and its various subgroups (a, b, g and n) as well as IEEE 802.16, also known as WiMAX. The present disclosure can also communicate using the 900 MHz radio frequency band 85 in locations where line-of-sight between the transmitter and the receiver is difficult to achieve. The present disclosure can also communicate using the 4.9 GHz public safety frequency band 84 in installations where the user has an FCC license to operate in that frequency band.

Because the 802.11, 900 MHz and some of the 802.16 frequency bands are unlicensed, they can be interfered with and potentially even jammed by unscrupulous attackers. The present disclosure constantly monitors the state of the wireless connection over these radios, and if it detects that the radio is being jammed or has stopped working, it automatically "fails-over" to one of two backup methods of communicating. First, the present disclosure can communicate over a wired Ethernet network 86 in cases where a wired connection is available. Where a wired connection is not available, the present disclosure can create a dial-up connection to the monitoring location using the cellular telephone network 88. This is accomplished with a cellular socket modem installed in the present disclosure which supports data communications using the GPRS (General Packet Radio Service) protocol over the GSM (Global Standard for Mobile) network or the CDMA (Code Division Multiple Access) protocol over the 1xRTT (single carrier (1x) Radio Transmission Technology) cellular network. When such a "fail over" occurs, the present disclosure automatically signals an alarm 92 to the monitoring location software so that observers can attempt to resolve the failure. In addition, because the cellular networks are about $\frac{1}{10}^{th}$ the speed of the wireless data networks, the present disclosure automatically slows the capture of video images to 1 to 5 frames per second (instead of the normal 25 to 30 frames per second) to prevent overloading the network with data.

Figure 5:
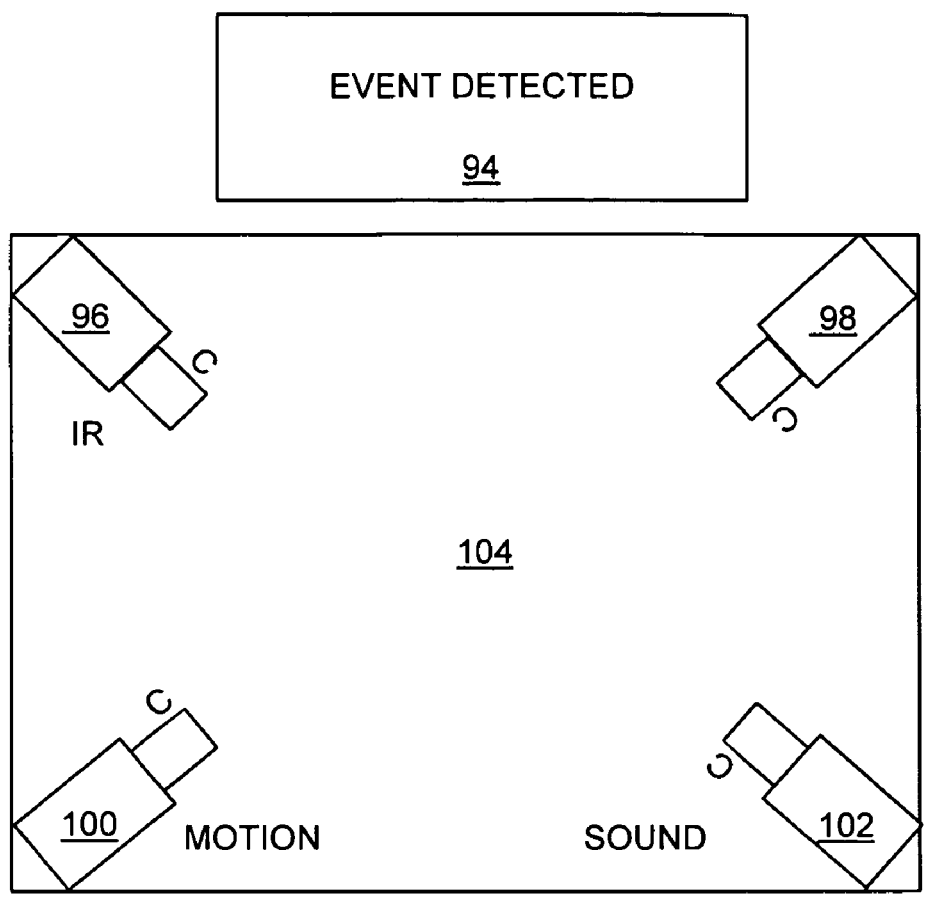
FIGS. 5 and 5A illustrate the functionality of the system in response to events detected in the video stream.
Figure 5A:
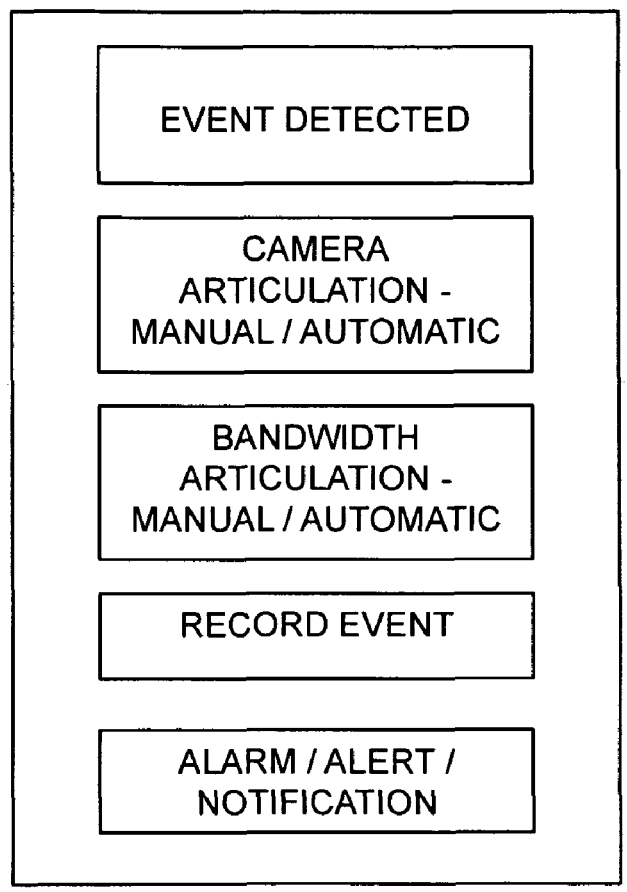

FIGS. 5 and 5A illustrate how the present disclosure responds to various security-related events at a location. The FIG. 5 shows a monitored space 104 with cameras 96, 98, 100 and 102 providing surveillance of the space. Also, at three of the cameras, sensors are co-located. At camera 96, an IR (infrared) sensor is installed to detect motion via heat transference, at camera 100, a traditional electronic motion detector is installed, and at camera 102 a sound sensor is installed. All of these sensors can be connected to the present disclosure through the dry contact interface. When an event occurs 94, such as motion or sound being detected, the security controller correlates the event with a specific location, and directs the PTZ control of the closest cameras to reposition the camera in the direction of the event.

FIG. 5A describes the logic the present disclosure uses. Once the event is detected, the present disclosure articulates the PTZ of the relevant camera and immediately adjusts the flow of video from all the cameras. The frame capture rate of cameras that do not have a view of the event are reduced to a minimum, and the frame rate of the cameras that do have a view of the event are increased as is the resolution of the image being captured. The event is recorded at the present disclosure and then an alarm notification is sent over the wireless connection to the monitoring location for a response. The alarm notification can also take the form of a text message to a cellular telephone, a message to a pager or an email message to a specified email address.

Figure 6:
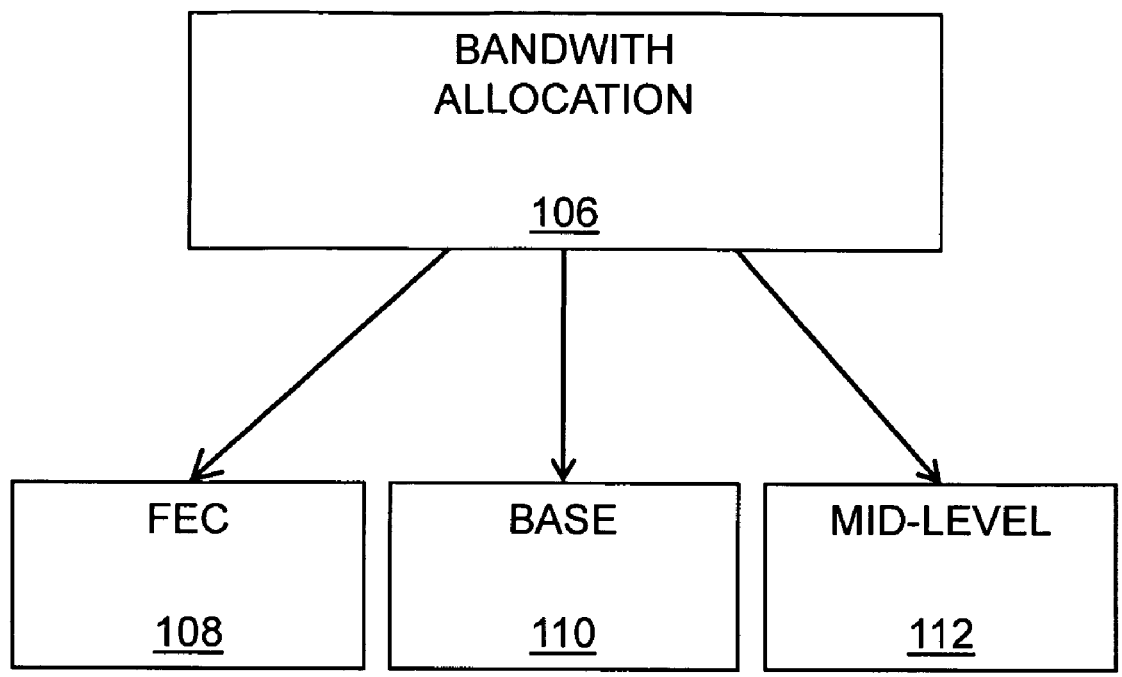
FIG. 6 illustrates the components of Forward Error Correction (FEC) that consume bandwidth in the integrated security controller.

FIG. 6 illustrates the dynamic use of bandwidth in the present disclosure by controlling the amount of FEC being transmitted. The bandwidth allocation module 106 continuously monitors the status of the wireless network. The data streams being transmitted over the wireless network are all encapsulated with FEC 108 to allow recovery. The base amount of FEC 110 is determined when the present disclosure initializes by a brief sample of the available network bandwidth. As the data streams are flowing, the bandwidth allocation module 106 may add additional FEC 112 to the streams in response to a network that is experiencing a higher degree of data loss or interference.

The present disclosure addresses the troublesome limitations of packet loss in traditional wireless communication through two innovative techniques. Using an advanced form of forward error correction ("erasure coding"), packets of video data are augmented with additional packets of error correction information. As all of the packets are transmitted, if and when packet loss occurs, the receiver is able to reassemble the original data packets using the additional information stored in the error correction packets. In one embodiment, the security controller uses a variation of the Reed-Solomon Erasure (RSE) technique to create the error correction information.

Second, the security controller continuously monitors the "health" of the wireless connection between the sender and receiver, by examining the amount of data loss being experienced, the radio signal strength, and number of errors occurring during transmission. More specifically, the controller continuously senses the state of the wireless channel and sends test packets to measure the following parameters: round trip time (RTT), packet loss rate, bit rate, retries and link quality (signal & noise data). These parameters are then used to feed the configurable erasure correction formula so that the optimal amount of redundant data is transmitted with each packet of video. Using this information, the security controller selectively adds or removes additional error correction data to the video data being transmitted. Thus, in especially "noisy" or "lossy" connections, the security controller adds additional error correction data enabling the receiver to reassemble the video even when large amounts of the transmitted data is lost in the connection.

More specifically, the software described herein (called "the disclosed system") is a combination of several video processing software elements: erasure coding, selective application of erasure coding to specific video frames, data interleaving, block allocation based on actual errors, network health monitoring with adaptive erasure coding, MAC layer protocol enhancement, and selective acknowledgement & retransmit. All data is transmitted in a secure, encrypted form using the Advanced Encryption Standard (AES) algorithm (Federal Information Processing Standards (FIPS) Publication 197).

A technique commonly used to recover losses in real-time communications is forward error correction (FEC). FEC techniques enable a receiver to correct errors/losses without contacting the sender. Since CRC-based error detection at the link layer results in the discarding of the corrupt packets, many FEC-based protocols strive to overcome the "erased" packets at application level.

As shown in FIG. 7, an (n, k) block erasure code converts k source data elements 114 using encoder 115 into a group of n coded data elements 116, such that any k of the n encoded data received 117 and decoded 118 can be used to reconstruct the k source data elements 119. Usually, the first k data in each group are identical to the original k data; the remaining n−k data are referred to as parity (FEC) data.

Usually, FEC codes are able to correct both errors and erasures in a block of n symbols. In coding theory, an error is defined as a corrupted symbol in an unknown position while an erasure is a corrupted symbol in a known position. Traditionally, FEC techniques are described as loss detecting and/or loss correcting.

In FEC codes, redundant data is derived from original data using techniques from coding theory. Many schemes can be applied to implement erasure codes. Traditional error correcting codes include parity, LDPC, Reed-Solomon, and Hamming codes.

Reed-Solomon (RS) codes are a special class of linear non-binary block codes having the specific property to correct both errors and erasures in a block of n symbols (packets). Linear block code C(k, n) takes k source messages as input $M=(x1, \ldots, xk)$, and produces a codeword $(y1, \ldots, yn)$ of n check symbols. RS code achieves an ideal error protection against packet loss, since it is a maximum distance separable (MDS) code, which means that no other coding scheme can recover lost source data symbols from fewer received code symbols. Still, RS codes are intrinsically limited by the Galois Filed size it uses. A typical example is GF(8), i.e., we use a 8 bits symbol, where $n \leq 256$. In this case, for a packet size of 1 KB and for 100% of additional FEC redundancy packets, the maximum number of original packet that can be protected in a single FEC block is 128. It is worth mentioning that 128 packets are fairly sufficient for delay-sensitive flows that require firm delays bounds. Besides block size limitation, RS codes suffer also from computation complexity when implemented in software. Reed Solomon (RS) codes are the most widespread FEC codes being used in reliable telecommunication systems (e.g., in DVB-S communication, DVD systems and many other storage and networking systems).

Low Density Parity Check is a linear error correcting code whose parity check matrix is very sparse. This form of code is parallelizable, and VLSI technology has gotten to the point where LDPCs over fairly large code word sizes can be implemented in hardware. With the selection of LDPC codes for the satellite digital broadcasting standard (DVB-S2), efficient VLSI implementation of these codes has become all the more important. These codes have two main advantages: (i) they use XOR operations for high speed encoding/decoding, which is much suitable for handheld receiver devices, and (ii) they operate on very large source blocks. However, LDPC are not maximum distance separable codes, which mean that they are less bandwidth-efficient than RS codes. Typically, LDPC needs to introduce more redundancy than RS to recover the same number of lost packets. Additionally, LDPC-based codes generate n encoded symbols that are completely different from the original k source symbols.

Packet level RS codes are best suited for protecting real-time streams (live and on-demand audiovisual streams) and LDPC codes are better suited to non-real-time streams (off-line audiovisual content downloading such as news, movies, large files, etc.)

The disclosed technology uses a modified form of Reed Solomon codes based on Vandermonde matrices due to its proven scalability for capacity-constrained wireless transmission. In the following, the use of the term FEC is meant as Reed Solomon codes.

Forward error correction can be done at many levels from the individual bit & byte level up to the packet level. In a byte level FEC, a byte is considered as a symbol while in packet level FEC, a symbol is a packet. Byte level FEC is already implemented at the physical layer of almost all wireless networks. Packet level FEC consists of producing h redundant packets from k original ones. FEC packets are generally based on erasure coding and their usefulness lies in the fact that (i) a single parity packet can be used to correct different single-packet losses in a group of packets, i.e., packets belonging to a given FEC block; (ii) byte level FEC is unable to recover a completely lost or delayed packet; (iii) when using a byte level FEC, a corrupted packet is already detected and discarded at the network link layer before being available at application level; hence, using a bit-level FEC at application level implies disabling error detection mechanisms (CRC and CHEKSUM) of underlying layers.

Although most of existing wireless access networks use physical-layer-integrated adaptive coding and modulation schemes (e.g., WiMAX uses variable-rate Reed-Solomon (RS)/Convolutional Coding (CC) schemes and variable-modulation scheme), packet-level FEC protocols are still required. Wireless communication experiences both (i) short-term fast fading and white Gaussian noise, which is addressed by the integrated physical layer coding and (ii) long-term slow fading (e.g., when entering a tunnel), which is addressed by a packet level FEC encoding.

The above-introduced two levels of FEC encoding are fully complementary; each level addressing different problems. While almost all MAC/PHY layers implement some form of byte-level FEC, the disclosed system requires additional packet-level FEC protection to increase the reliability of video communications in wireless communications.

The selective application of erasure coding to specific video frames involves adding more redundant data elements to more "important" video frames. Video that is compressed using the MPEG4 technique is divided into 3 different types of frames—I, P and B frames. The receiver can gracefully sustain or conceal the loss of "less important" frames (B and P frames), but if "more important" frames (I frames) are lost, then the video becomes jerky and blocky. Our technique applies additional redundant data to the "more important" frames while applying less redundant data to the "less important" frames.

Packet loss in wireless networks can exhibit temporal dependency or burstiness. For instance, if packet n is lost, packet n+1 is also likely to be lost. This collection of consecutive lost packets may worsen the perceptual quality of the received video compared to random loss at the same average loss rate. As a consequence, the performance of FEC is affected, i.e., the percentage of packets that can not be recovered. Moreover, the final loss pattern (FLP) after FEC recovering could be even burstier due to the dependency between loss events.

Combining a loss-run-length model and an inter-loss distance model facilitates accurately capturing the channel burstiness, i.e., loss clustering and the distances between those clusters. Using this technique, FEC blocks are allocated to reduce or minimize the transmitted redundancy packets while achieving high robustness against wireless loss. Moreover, the FEC block allocation method can be used to dynamically tune the transmitted amount of redundancy. The FEC allocation scheme takes into account the redundant FEC packets when projecting the future loss pattern segment over the communication link.

Data interleaving is a useful technique that is commonly used in video streaming systems to reduce the effects of loss. The data interleaving component is implemented wherein the sender resequences the packets before transmitting them to the receiver, so that originally adjacent packets are separated by a certain distance that may eventually be variable over the time. The transmitted packets are returned to their original order at the receiver. The interleaving disperses the effect of packet loss. The interleaving disperses the effect of packet losses. This allows mitigating the effect of "bursty" losses on video decoding. The key advantage of interleaving is that it does not increase the bandwidth requirement of a stream while provide better resiliency. It is particularly effective for multimedia streams where short-term dependencies between data exist (i.e., predictive coding); here adjacent losses means error propagations, which affect the quality of decoded content (i.e., even correctly received data may be useless).

The disadvantage of the interleaving, however, is that it increases the latency due to an addition buffering at the sender. FEC interleaving is capable of minimizing the effect of burst errors at the decoding level, though its efficiency still depends on the amount of FEC redundancy being transmitted.

Figure 8:
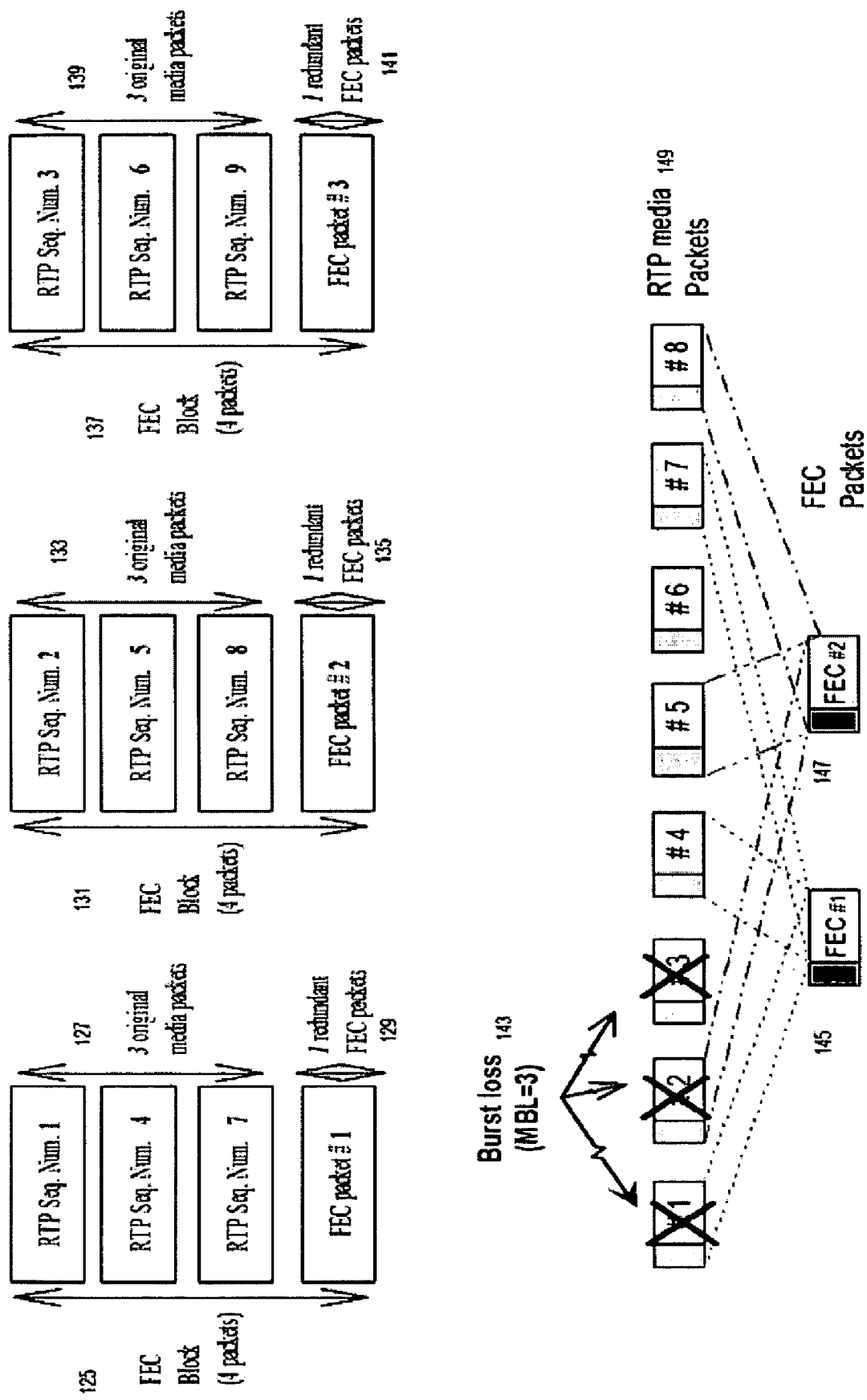
FIG. 8 illustrates the interleaving technique of the Forward Error Correction (FEC) algorithm.

FIG. 8 illustrates a typical example of FEC interleaving where the interleaving stride is three (3). This means that each FEC block protects video packets separated each time by two packets. Video packets 127, 133 and 139 received in sequence are spread across a group of blocks (125, 131, 137). FEC packets 129, 135, and 141 are added to those blocks prior to transmission. A single FEC packet per block is sufficient to repair a burst of three dropped packets 143 in the data stream 149. FEC packets 145 and 147 are used to recreate the lost packets. In contrast, the absence of FEC interleaving would require the use of 3 FEC packets per block in order to recover from such a packet loss burst.

As highlighted earlier, wireless communications are characterized by high correlation between packet losses, which significantly decreases the efficiency of FEC schemes. In order to reduce the effect of clustered losses, redundant information could be added into temporally distant packets, which introduces even higher delay. Hence, the repair capability of FEC is mainly limited by the delay budget.

Since the wireless link fluctuations occur usually through unpredictable adjacent packet losses, the disclosed system uses an interleaved FEC protection. As depicted in FIG. 8, the redundant FEC packets protect temporally scattered RTP packets in order to cope with sporadic packet losses on the wireless link. This increases the FEC efficiency through improving loss resiliency at the client.

Within the disclosed system, streaming video is divided into transmission (FEC application) rounds. A transmission round ends when the sender (the Security Controller) transmits the last packet of a group of video packets. The group of video packets results from an integer number of video frames (i.e., one, two, three, four or five frames). To simplify the description of the disclosed system, we assume that the group of packets results from a single video Frame.

The group of video packets is organized into several interleaved UBs (Unequal loss protection Block). FIG. 9 illustrates how an UB consists of n=k+h packets. The entire block 154 is created by assembling the original k packets 152 and adding h redundant (FEC) packets 156 to the stream. At this point, the interleaving factor (i) is defined as the Sequence Number (SN) difference between each two successive packets protected in the same UB. The interleaving factor (or stride) is fixed for the k protected packets belonging to the same UB (see formula (5)); the interleaving factor is fixed for all packets belonging to the same group of packets. When i=1, the interleaved protection is not applied and, hence, the FEC packets protect consecutive data packets only.

$$\forall j, 1 \leq j \leq k-1 : i = UB_{j+1}^m.SN - UB_j^m.SN \quad (5)$$

Here, $UB_{jm}.SN$ represents the sequence number of the jth media packet belonging to the mth UB. FIG. 10 summarizes the UI-FEC scheme working example for an interleaving factor i=3. Video frames 160 are divided into NALUs (Network Abstractoin Layer Units), and then spread across UBs 162, 164 and 166. Note that for a given group of packets, the interleaving factor (i) represents the number of UBs 162, 164 and 166 in which the packets will be FEC-protected.

After applying FEC, the media packets are transmitted in their initial order (i.e. according to the sequence number order). Note that the delays introduced by the FEC interleaving do not have important consequences, since interleaving is applied over few video frames. The exact number of frames used in a single FEC application round is determined based on processing and memory capacities of the Security Controller and wireless receivers. There is actually a crucial tradeoff between FEC recovery performances and the number of video packets used in each FEC application round. Large buffering at the Security Controller provides increased FEC performance, but with the tradeoff of higher latency.

Within the disclosed system, consecutive video packets are protected in different FEC blocks in order to achieve an interleaved FEC protection. Further, the employed interleaving stride may change over time depending on certain parameters. This novel interleaving over a single group of video packet is used to provide an adaptive and unequal interleaved FEC protection.

For FEC efficiency reasons, it is desirable to keep the number of information packets (k) as high as possible with few redundant packets. Large FEC blocks provide higher loss resiliency, especially to counter short-term fluctuations usually present in bursty wireless channels. Moreover, a higher number of video packets per FEC block lead to better granularity, which allows adjusting the redundancy rate more precisely according to wireless channel conditions. As an example, if a frame to be transmitted has a size of 10 Kbytes, a packet payload size (NALUsize) of 1 Kbyte will result in 10 data packets. This makes the precision at which the error protection can be applied in units of 10% (i.e. one packet of redundancy will make the transmission reliable against packet loss rates up to 10%, two packets of redundancy can withstand up to 20% losses, and so on).

The parameter L sets a minimum number (k) of video packets for every UB to be transmitted. Following the formula (6), we fix both interleaving factor (i) and the number (k) of media packet per UB; where the VideoFrameSize is obtained from the frame header. MBL (mean burst length) fixes (i) together with (k), in order to increase the FEC responsiveness in the real-time adaptive system.

$$i = \left\lceil \frac{VideoFrameSize}{L \times PacketSize} \right\rceil, \text{ with } 2 \le i \le MBL \quad (6)$$

The interleaving factor is tightly dependent on frame size. Since the different frames of a coded MPEG-4 video sequence have different sizes, the interleaving factor (i) scales along with the frame size. An intra-coded picture (I frame) uses more bytes than an inter-coded picture (P or B frame). The larger the inter-coded picture is, the more it codes a highly dynamic scene with different texture, and the more it involves an important video distortion when lost. As a consequence, with the disclosed system's FEC, the interleaving protection is applied differently based on frame size and hence frame relevance, which provides a better loss recovery for the most sensitive MPEG-4 video bitstream. Thus, video frames are unequally interleaved based on their relevance, then efficiently protected, and finally transmitted in the network.

Ideally, the adaptive FEC scheme used in the disclosed system is based on systematic RS(n, k) packet-level codes, where n, k and i could be re-assigned for each group of frames to be transmitted based on their relevance and the current loss pattern of the communication channel. First, we constrain the number of video packets to be used in the current FEC application round. The Security Controller performs MBL measurements sent by its receivers to determine the interleaving stride (i) to be used in current FEC application round. The interleaving factor represents the number of FEC blocks in the current round. Afterward, different FEC blocks are filled with video packets and the number of video packets per FEC block (k) is finally fixed. Second, based on the redundancy control model, we calculate the number of redundant FEC packets (h) per FEC block. To do this, we need the mean loss rate measurement (p) as reported by receivers and the number of video packets per FEC block (k) as provided in the last step. The amount of redundancy to be transmitted is computed once per each FEC round.

The network monitoring component is implemented as the controller continuously senses the state of the wireless channel and sends test packets to measure the following parameters: round trip time (RTT), packet loss rate, bit rate, retries and link quality (signal & noise data). The feedback mechanism uses receivers to periodically send a list of which packets were received and which were lost in the prior window of N packets. Given this information, the loss characteristics (including burst loss) can be captured at the sender. These parameters are then used to feed the configurable erasure correction formula so that the optimal amount of redundant data is transmitted with each packet of video.

Typical packet-level FEC protocol that uses k media packets to produce n packets, among which h=n−k parity packets, have the capacity to overcome up to h packet loss (when using MDS codes). This basically provides a resiliency against a maximum packet loss rate of p=h/n when considering that even FEC packets may be affected by loss. Based on averaged packet loss rate (p) measurements such as that provided by this network monitoring component, it is possible to dynamically adjust the redundancy amount as follows $$h = \frac{p \cdot k}{(1 - p)}$$

Based on the number (k) of media packets to be protected and mean loss rate (p) measurements, the number of parity packets is easily determined. The maximum acceptable loss rate threshold beyond which the streaming server would calculate the amount of FEC adaptation may be different depending on the nature of audiovisual content and its loss resiliency characteristics. By using the MPEG-4 encoder characteristics, this loss rate threshold may be a-priori extracted to improve the accuracy (efficiency) of adaptive FEC mechanisms.

However, this approach poses a problem when addressing channels that exhibit different packet loss rates throughout the video session lifetime. In realistic communications, the packet loss process is usually variable over time, in which case the use of averaged loss rate to adjust the redundancy may fall short in providing optimal FEC transmission. Additional loss-specific metrics may be helpful to drive better FEC adaptation. For instance, information regarding the burstiness of packet losses would be beneficial for the whole FEC adaptation system.

Adaptation to network changes by dynamically adjusting the redundancy transmission is a major problem that determines the effectiveness of FEC schemes. This control problem is not trivial due to the fact that increased redundancy, beyond a certain point, can result in self-induced congestion. In contrast, with a too reduced FEC transmission, receivers would fail to recover lost packets, producing poor video quality. As a consequence, in addition to network-based feedback, the disclosed system's FEC adaptation monitors the available wireless bandwidth before adjusting the FEC redundancy.

The MAC layer protocol enhancement involves using UDP (User Datagram Protocol—one of the core protocols of the Internet protocol suite), eliminating MAC-level retransmits and exploiting a feature of the 802.11 networking standard known as "point coordinated function" (PCF). UDP is a non-acknowledged mechanism for transmitting data between a sender and a receiver. By using this technique, the amount of overhead data transmissions that occur in a typical TCP/IP acknowledged network is reduced. However, even when UDP data is transmitted over an IEEE 802.11 standard network, the MAC layer will wait for an acknowledgement from the receiver (unless the destination is a multicast IP address). If the sender does not receive an acknowledgement, it will initiate a retransmit of the packet. Our technique disables this retransmit feature of the 802.11 standard and uses FEC to recreate any packets that aren't received by the receiver.

The default operating mode of 802.11 network cards is "distributed coordinated function" (DCF) which is a time-sharing (collision avoidance) data transmission technique. A device on the network that wishes to transmit first listens on the channel to see if any other device is transmitting, and if none are, then it transmits. Devices configured this way can easily be jammed, and throughput is limited because of the wait time. In PCF mode, a network device operating as an access point can specifically contact each device one-on-one on the network and ask if there is any data to transmit. If so, then a one-to-one conversation is begun between the access point and that device. There is no wait time. This improves the overall throughput of the network.

Finally, the selective acknowledgement technique ensures that enough of the redundant data is received, even in light of up to 25% packet loss, by specifically requesting retransmission of "more important" packets, including the FEC packets. This so-called Hybrid Automatic Repeat reQuest (H-ARQ) technique combines packet-level FEC and ARQ techniques to join together the efficiency of Automatic Repeat reQuests (ARQs) and the restorative features of FEC. This way, the receiver can ask the sender to re-transmit only the lost packets within the application layer. This embodiment includes a Hybrid ARQ type I implementation, which consists of continuously sending a certain amount of FEC redundancy. A retransmission request takes place for non recovered packets, if it is known that the retransmission could occur within the time allowed by the amount of packet buffering in the receiver.

In addition to security applications, the foregoing techniques can be applied with equal utility in other multimedia applications, such as wireless delivery in the home or business. In this regard, embodiments of the present disclosures disclosed herein may be applied for content delivery for personal multimedia products, such as the MP3 players. In addition, aspects of the present disclosure can be utilized to enable multimedia to be streamed wirelessly directly from the residential gateway to these types of wireless-enabled devices:

Set top boxes and other IP multimedia systems. Enables streaming of standard and high definition (HD) television from the residential gateway to wireless set top boxes and other IP enabled systems distributed throughout the home.

Wireless gaming. Reliable wireless interface for massively multiplayer and other video games.

Voice over IP (VoIP). Reliable, wireless voice communications over IP telephone systems in the home.

Other data-intensive multimedia communications.

Wireless Bandwidth Improvement

In one embodiment, the security controller exploits a feature of the 802.11 wireless networking standard called PCF (point coordination function). The default operating mode for 802.11 devices is DCF (distributed coordination function). In DCF mode, the wireless transmitter first listens to see if any other device is currently transmitting on the channel. If the channel is clear, then the transmitter sends a packet of information and awaits an acknowledgement that its packet was received. This technique works well in a typical wireless network where there are several "client" computers communicating through an access point to connect to the Internet.

However, the DCF mode is not optimal for the higher bandwidth requirements of continuous video. Using the PCF mode, which is a polling mode of operation, the security controller is specifically requested to send its video data by the receiving unit, and a direct, two-way communication dialog ensues, during which no other devices can transmit. This "clears the airwaves" of potential interference and contention, allowing the security controller full access to virtually the entire bandwidth available on the wireless network. Since video transmission uses much more bandwidth than typical data transmissions, the PCF mode allows higher quality and a higher volume of video data to be transmitted than is available in off-the-shelf network devices.

Security Device Integration

In a preferred embodiment, the security controller of the present disclosure integrates the functionality of multiple devices in a single, easy-to-install and easy-to-manage package. FIG. 11 illustrates the connection points to the present disclosure. From one to four wired analog cameras are connected via BNC connectors 172. From one to four wired digital cameras are connected via RJ-45 connectors 182. Sensors, including an optional panic button (which, when pressed, immediately transmits an alarm over the wireless network to the monitoring software), are connected via a dry contact interface 184. Electrical power is applied through connector 186. A connection to a local area network is provided through an RJ-45 connector 180. A connector reserved for future use is at 174. An interface to alarm panels, access control devices and pan, tilt, zoom (PTZ) cameras is provided using the EIA RS-485 protocol connector 176. Two antennas for the primary wireless communication facility are connected at 170. A single antenna for communicating over the cellular telephone network in the event of a fail over is connected at 178.

This related security data can be combined with the surveillance video and transmitted wirelessly, freeing the installer from having to run long distances of cables and wires to these devices. The receiver can then monitor and control these additional appliances over the wireless network.

While the present disclosure has been described with reference to one or more particular embodiments, those skilled in the art will recognize that many changes may be made thereto without departing from the spirit and scope of the present disclosure. In particular, while much of the above-discussion refers to security applications for ease of discussion, it will be readily understood that the present disclosures disclosed herein will have equal applicability to other forms of video transmission and networking. Each of these embodiments and obvious variations thereof is contemplated as falling within the spirit and scope of the claimed present disclosure, which is set forth in the following claims.

It will be apparent to those skilled in the art that various modifications and variations can be made in the present present disclosure and in construction of this present disclosure without departing from the scope or intent of the present disclosure.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. An integrated security controller comprising:
a communications controller;
a wireless transceiver;
a data input port for receiving a first digital video stream from a digital camera; and
a second data input port for receiving an analog video stream from an analog camera;
wherein said communications controller digitizes and encodes the analog video stream, thereby generating a second digital video stream,
and wherein said wireless transceiver performs an automatic failover to an alternative communications mode accompanied by an automatic adjustment of a frame rate of one or more of said digital video streams corresponding to a smaller bandwidth that is available over said alternative communications mode when said controller detects that a primary wireless communication mode has failed.

2. The integrated security controller of claim 1, wherein said communications controller encapsulates said digital video streams using wireless adaptive video encoding.

3. The integrated security controller of claim 1, wherein said integrated security controller is in communication with a panic button, said panic button adaptable to transmitting an alarm over a wireless network.

4. The integrated security controller of claim 1, wherein said alternative communications mode is selected from the group of CDMA, GPRS, EDGE and EV-DO.

5. The integrated security controller of claim 1, wherein said integrated security controller encrypts one or more of said digital video streams.

6. The integrated security controller of claim 1, wherein said integrated security controller encrypts one or more of said digital video streams using Advanced Encryption Standard—FIPS 197 encryption.

7. The integrated security controller of claim 1, wherein said integrated security controller encrypts said first and said second digital video streams.

8. The integrated security controller of claim 1, wherein said integrated security controller encrypts said first and said second digital video streams using Advanced Encryption Standard—FIPS 197 encryption.

* * * * *